(12) United States Patent
Park et al.

(10) Patent No.: US 9,495,095 B2
(45) Date of Patent: Nov. 15, 2016

(54) SYSTEM AND METHOD FOR IDENTIFYING INPUTS INPUT TO MOBILE DEVICE WITH TOUCH PANEL

(71) Applicant: Samsung Electronics Co. Ltd., Suwon-si, Gyeonggi-do (KR)

(72) Inventors: Jongdae Park, Seoul (KR); Heonseok Lee, Suwon-si (KR); Hoondo Heo, Suwon-si (KR); Dongsub Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 13/625,243

(22) Filed: Sep. 24, 2012

(65) Prior Publication Data

US 2013/0106776 A1 May 2, 2013

(30) Foreign Application Priority Data

Oct. 27, 2011 (KR) ........................ 10-2011-0110382

(51) Int. Cl.
*G06F 3/045* (2006.01)
*G06F 3/0488* (2013.01)

(52) U.S. Cl.
CPC ................. *G06F 3/04883* (2013.01)

(58) Field of Classification Search
CPC ................. G06F 2203/04809; G06F 3/04883; G06F 2203/04808
USPC .................................................. 345/173–178
See application file for complete search history.

(56) References Cited

U.S. PATENT DOCUMENTS

| | | | |
|---|---|---|---|
| 7,519,223 B2 * | 4/2009 | Dehlin | G06F 3/0354 345/173 |
| 2005/0052427 A1 | 3/2005 | Wu et al. | |
| 2006/0097991 A1 * | 5/2006 | Hotelling | G06F 3/0416 345/173 |
| 2006/0097997 A1 | 5/2006 | Borgaonkar et al. | |
| 2008/0158145 A1 | 7/2008 | Westerman | |
| 2010/0020026 A1 | 1/2010 | Benko et al. | |
| 2010/0110025 A1 * | 5/2010 | Lim | G06F 3/03547 345/173 |
| 2010/0171753 A1 * | 7/2010 | Kwon | G06F 1/3218 345/593 |
| 2010/0173679 A1 * | 7/2010 | Moon | H04M 1/67 455/566 |
| 2010/0211920 A1 * | 8/2010 | Westerman | G06F 3/04883 715/863 |
| 2010/0214232 A1 | 8/2010 | Chan et al. | |
| 2011/0055773 A1 | 3/2011 | Agarawal et al. | |
| 2011/0087663 A1 | 4/2011 | Tonegawa et al. | |

(Continued)

FOREIGN PATENT DOCUMENTS

| | | |
|---|---|---|
| CN | 101583924 A | 11/2009 |
| CN | 101882042 A | 11/2010 |

(Continued)

*Primary Examiner* — Andrew Sasinowski
*Assistant Examiner* — Brent D Castiaux
(74) *Attorney, Agent, or Firm* — Jefferson IP Law, LLP

(57) ABSTRACT

A system and a method of identifying a type of touch input to a mobile device with a touch panel are provided. The system includes a touch screen comprising a touch panel, a memory for storing information to execute a function of an application, corresponding to a touch area size and a touch interaction, and a controller. The controller identifies, when a touch is detected via the touch panel, the touch area size and the touch interaction. The controller determines information to execute a function corresponding to the identified touch area size and the identified touch interaction by referring to the memory. The controller controls a function of the application that is currently being executed.

17 Claims, 16 Drawing Sheets

(56) References Cited

U.S. PATENT DOCUMENTS

2011/0157078 A1    6/2011  Miyazawa et al.
2011/0181509 A1*   7/2011  Rautiainen .............. G06F 3/017
                                                        345/158
2011/0291944 A1*  12/2011  Simmons .............. G06F 3/0416
                                                        345/173

FOREIGN PATENT DOCUMENTS

| | | |
|---|---|---|
| CN | 102105853 A | 6/2011 |
| JP | 2005-100391 A | 4/2005 |
| JP | 2008-508600 A | 3/2008 |
| JP | 2010-191692 A | 9/2010 |
| JP | 2010-244132 A | 10/2010 |
| JP | 2011-086023 A | 4/2011 |
| JP | 2011-134271 A | 7/2011 |
| JP | 2011-154533 A | 8/2011 |
| JP | 2011-209773 A | 10/2011 |
| KR | 10-2010-0029421 A | 3/2010 |
| KR | 10-2011-0113141 A | 10/2011 |

* cited by examiner

FIG. 6A

| | X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|---|
| Y0 | 7 | 10 | -1 | 12 | -11 | -18 | -11 | 3 | -16 | -26 | -15 | -14 | 12 | 23 | 17 | 26 |
| Y1 | 20 | 12 | 8 | 14 | 12 | -2 | 29 | 24 | 36 | 13 | -5 | 7 | -3 | 17 | 8 | 28 |
| Y2 | 11 | 9 | 5 | 7 | 0 | -14 | -13 | 20 | -1 | -15 | -13 | -16 | 5 | -11 | -1 | 16 |
| Y3 | 12 | 9 | 3 | 6 | 12 | 7 | 29 | 32 | 38 | 23 | 7 | 7 | -3 | 5 | -1 | 23 |
| Y4 | 6 | 7 | 16 | 9 | 13 | 12 | -3 | 44 | 33 | -15 | 1 | -6 | 8 | -3 | 8 | 8 |
| Y5 | -5 | 1 | 10 | 8 | 13 | -1 | 26 | 53 | 39 | 12 | -6 | -19 | 20 | 0 | 14 | 14 |
| Y6 | 2 | 2 | 12 | 4 | 17 | 8 | 67 | 93 | 84 | 9 | -13 | 16 | 18 | 1 | 12 | 16 |
| Y7 | 2 | 11 | -2 | 2 | 4 | 10 | 41 | 185 | 151 | 3 | -7 | -25 | 5 | 6 | 7 | 16 |
| Y8 | -3 | -8 | 2 | 13 | 4 | 3 | 167 | 703 | 682 | 120 | -75 | -19 | -15 | -8 | -4 | 0 |
| Y9 | 8 | 2 | 12 | 10 | -15 | 31 | 398 | 759 | 741 | 388 | -114 | -54 | -6 | -7 | 14 | -9 |
| Y10 | -14 | -16 | -6 | 11 | -6 | 67 | 575 | 729 | 718 | 550 | -66 | -33 | -7 | -22 | -14 | -18 |
| Y11 | 4 | -4 | 6 | -6 | 8 | 126 | 606 | 720 | 689 | 640 | 61 | -49 | -16 | -6 | 20 | -3 |
| Y12 | -6 | -1 | -10 | -4 | -2 | 115 | 635 | 698 | 680 | 648 | 229 | 16 | -5 | -15 | 2 | -7 |
| Y13 | -13 | 3 | -2 | 2 | -9 | 131 | 560 | 672 | 638 | 653 | 540 | 21 | 9 | 5 | 21 | -7 |
| Y14 | 37 | 30 | 27 | 29 | 34 | 160 | 593 | 624 | 609 | 609 | 586 | 126 | 45 | 27 | -21 | -15 |
| Y15 | -8 | -4 | -8 | -13 | 9 | 240 | 642 | 616 | 587 | 613 | 672 | 119 | 22 | 8 | 27 | 6 |
| Y16 | -23 | -29 | -17 | 9 | 2 | 313 | 670 | 606 | 595 | 600 | 683 | 224 | 5 | 6 | 7 | -5 |
| Y17 | -30 | -17 | -25 | -16 | 11 | 352 | 635 | 560 | 550 | 585 | 701 | 316 | 24 | -16 | 14 | -12 |
| Y18 | -25 | -23 | -13 | -3 | -3 | 352 | 653 | 556 | 569 | 579 | 690 | 443 | 40 | -6 | -5 | -14 |
| Y19 | -13 | -2 | -7 | 3 | 11 | 276 | 652 | 583 | 559 | 586 | 709 | 409 | 39 | -3 | 17 | 3 |
| Y20 | -10 | -21 | -17 | 5 | -16 | 108 | 595 | 634 | 608 | 623 | 696 | 375 | 49 | 5 | 8 | -13 |
| Y21 | -20 | -16 | -5 | 1 | -8 | 5 | 217 | 619 | 614 | 643 | 707 | 191 | 25 | 3 | 12 | -7 |
| Y22 | -5 | -19 | 0 | 11 | -16 | -17 | -28 | 314 | 638 | 739 | 611 | 119 | 26 | 1 | -11 | -17 |
| Y23 | -17 | -14 | -6 | 2 | -6 | -20 | -38 | 79 | 252 | 404 | 262 | 38 | 26 | 6 | 8 | 6 |
| Y24 | 10 | 3 | 8 | 17 | -6 | 7 | 11 | 47 | 98 | 138 | 96 | 51 | 16 | 1 | -5 | 7 |
| Y25 | 23 | 23 | 16 | 21 | -13 | -1 | 1 | 12 | 31 | 40 | 17 | 20 | 5 | 0 | -13 | 9 |

FIG. 6B

|  | X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|---|
| Y0 | 20 | 9 | 18 | 8 | 2 | 1 | -41 | -36 | -39 | -61 | -56 | -13 | -9 | 3 | 17 | 32 |
| Y1 | 19 | 5 | 25 | 10 | 9 | 0 | 14 | -5 | 4 | -13 | -28 | 9 | -8 | 9 | -22 | 17 |
| Y2 | 6 | 1 | 5 | -9 | -15 | -14 | -31 | -17 | -22 | -38 | -28 | -30 | -8 | -14 | 5 | 19 |
| Y3 | -11 | 0 | 10 | 9 | 9 | -12 | 11 | 1 | 14 | 9 | -12 | 8 | -2 | 20 | -10 | 6 |
| Y4 | 17 | -3 | 24 | 14 | 7 | 0 | -32 | 14 | 13 | -43 | -35 | -15 | -7 | -25 | -4 | 14 |
| Y5 | -5 | -3 | 18 | 17 | 4 | -12 | -22 | 9 | -2 | -40 | -35 | -13 | 6 | -5 | 15 | 16 |
| Y6 | -7 | 4 | -1 | 11 | 15 | 11 | 16 | 63 | 38 | -17 | -34 | 15 | 3 | 25 | 7 | 7 |
| Y7 | -4 | -8 | 26 | 18 | 6 | -1 | -9 | 109 | 75 | -56 | -67 | -22 | -17 | 1 | 2 | 13 |
| Y8 | -15 | -8 | -4 | 5 | -19 | -46 | 52 | 552 | 525 | -27 | -188 | -22 | -26 | 18 | -12 | -13 |
| Y9 | 12 | -4 | 8 | -26 | 6 | -29 | 222 | 566 | 543 | 182 | -262 | -143 | -40 | -26 | -22 | 4 |
| Y10 | -2 | -16 | -38 | -25 | -25 | -7 | 391 | 536 | 505 | 350 | -219 | -68 | -23 | 5 | -15 | -31 |
| Y11 | -14 | -36 | 21 | -21 | 14 | 30 | 403 | 454 | 428 | 401 | -133 | -128 | -54 | -36 | -14 | 22 |
| Y12 | -36 | -35 | -30 | -17 | -26 | 34 | 426 | 448 | 412 | 409 | 34 | -30 | -27 | 17 | -11 | -8 |
| Y13 | -21 | -32 | 2 | -38 | 12 | 27 | 363 | 379 | 347 | 376 | 316 | -67 | -53 | -14 | -13 | 16 |
| Y14 | 9 | 12 | 10 | 20 | 2 | 77 | 395 | 378 | 336 | 342 | 365 | 77 | 7 | 30 | -22 | -12 |
| Y15 | -23 | -40 | 7 | -44 | 9 | 139 | 442 | 304 | 274 | 295 | 429 | 17 | -56 | -38 | -35 | 12 |
| Y16 | -34 | -33 | -65 | -39 | -22 | 240 | 450 | 311 | 259 | 285 | 426 | 169 | -3 | 10 | -25 | -20 |
| Y17 | -19 | -42 | 3 | -54 | 24 | 269 | 410 | 239 | 179 | 253 | 450 | 188 | -44 | -33 | -32 | 1 |
| Y18 | -19 | -31 | -70 | -37 | -19 | 268 | 401 | 265 | 228 | 243 | 457 | 362 | 3 | 21 | -12 | -32 |
| Y19 | -30 | -44 | 9 | -45 | 15 | 178 | 418 | 260 | 195 | 259 | 462 | 269 | -3 | -36 | -35 | 8 |
| Y20 | -28 | -39 | -63 | -35 | -43 | 26 | 368 | 339 | 305 | 335 | 486 | 292 | 19 | 23 | -14 | -34 |
| Y21 | -34 | -31 | 3 | -47 | -6 | -65 | 64 | 342 | 330 | 383 | 487 | 58 | -20 | -22 | -33 | 17 |
| Y22 | -11 | -10 | -37 | -16 | -14 | -64 | -183 | 147 | 449 | 538 | 398 | 69 | 11 | 7 | -22 | -30 |
| Y23 | -7 | -19 | 1 | -13 | 3 | -41 | -98 | -23 | 137 | 312 | 155 | 21 | 8 | -12 | -7 | 22 |
| Y24 | 6 | 7 | -17 | 7 | 7 | -6 | -42 | -20 | 54 | 90 | 47 | 48 | -1 | 11 | -6 | -5 |
| Y25 | 4 | 16 | -11 | 8 | 4 | 5 | -28 | -22 | -4 | 6 | -18 | 19 | 20 | 17 | -6 | -11 |

FIG. 7A

| | X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|---|
| Y0 | 7 | 10 | -1 | 12 | -11 | -18 | -11 | 3 | -16 | -26 | -15 | -14 | 12 | 23 | 17 | 26 |
| Y1 | 20 | 12 | 8 | 14 | 12 | -2 | 29 | 24 | 36 | 13 | -5 | 7 | -3 | 17 | 8 | 28 |
| Y2 | 11 | 9 | 5 | 7 | 0 | -14 | -13 | 20 | -1 | -15 | -13 | -16 | 5 | -11 | -1 | 16 |
| Y3 | 12 | 9 | 3 | 6 | 12 | 7 | 29 | 32 | 38 | 23 | 7 | 7 | -3 | 5 | -1 | 23 |
| Y4 | 6 | 7 | 16 | 9 | 13 | 12 | -3 | 44 | 33 | -15 | 1 | -6 | 8 | -3 | 8 | 8 |
| Y5 | -5 | 1 | 10 | 8 | 13 | -1 | 26 | 53 | 39 | 12 | -6 | -19 | 20 | 0 | 14 | 14 |
| Y6 | 2 | 2 | 12 | 4 | 17 | 8 | 67 | 93 | 84 | 9 | -13 | 16 | 18 | 1 | 12 | 16 |
| Y7 | 2 | 11 | -2 | 2 | 4 | 10 | 41 | 185 | 151 | 3 | -7 | -25 | 5 | 6 | 7 | 16 |
| Y8 | -3 | -8 | 2 | 13 | 4 | 3 | 167 | 703 | 682 | 120 | -75 | -19 | -15 | -8 | -4 | 0 |
| Y9 | 8 | 2 | 12 | 10 | -15 | 31 | 398 | 759 | 741 | 388 | -114 | -54 | -6 | -7 | 14 | -9 |
| Y10 | -14 | -16 | -6 | 11 | -6 | 67 | 575 | 729 | 718 | 550 | -66 | -33 | -7 | -22 | -14 | -18 |
| Y11 | 4 | -4 | 6 | -6 | 8 | 126 | 606 | 720 | 689 | 640 | 61 | -49 | -16 | -6 | 20 | -3 |
| Y12 | -6 | -1 | -10 | -4 | -2 | 115 | 635 | 698 | 680 | 648 | 229 | 16 | -5 | -15 | 2 | -7 |
| Y13 | -13 | 3 | -2 | 2 | -9 | 131 | 560 | 672 | 636 | 653 | 540 | 21 | 9 | 5 | 21 | -7 |
| Y14 | 37 | 30 | 27 | 29 | 34 | 160 | 593 | 624 | 609 | 609 | 586 | 126 | 45 | 27 | -21 | -15 |
| Y15 | -8 | -4 | -8 | -13 | 9 | 240 | 642 | 616 | 587 | 613 | 672 | 119 | 22 | 8 | 27 | 6 |
| Y16 | -23 | -29 | -17 | 9 | 2 | 313 | 670 | 606 | 595 | 600 | 663 | 224 | 5 | 6 | 7 | -5 |
| Y17 | -30 | -17 | -25 | -16 | 11 | 352 | 635 | 560 | 550 | 585 | 701 | 316 | 24 | -16 | 14 | -12 |
| Y18 | -25 | -23 | -13 | -3 | -3 | 352 | 653 | 556 | 569 | 579 | 690 | 443 | 40 | -6 | -5 | -14 |
| Y19 | -13 | -2 | -7 | 3 | 11 | 276 | 652 | 583 | 559 | 586 | 709 | 409 | 39 | -3 | 17 | 3 |
| Y20 | -10 | -21 | -17 | 5 | -16 | 108 | 595 | 634 | 608 | 623 | 696 | 375 | 49 | 5 | 8 | -13 |
| Y21 | -20 | -16 | -5 | 1 | -8 | 5 | 217 | 619 | 614 | 643 | 707 | 191 | 25 | 3 | 12 | -7 |
| Y22 | -5 | -19 | 0 | 11 | -16 | -17 | -28 | 314 | 638 | 739 | 611 | 119 | 26 | 1 | -11 | -17 |
| Y23 | -17 | -14 | -6 | 2 | -6 | -20 | -38 | 79 | 252 | 404 | 262 | 38 | 26 | 6 | 8 | 6 |
| Y24 | 10 | 3 | 8 | 17 | -6 | 7 | 11 | 47 | 98 | 138 | 96 | 51 | 16 | 1 | -5 | 7 |
| Y25 | 23 | 23 | 16 | 21 | -13 | -1 | 1 | 12 | 31 | 40 | 17 | 20 | 5 | 0 | -13 | 9 |

FIG. 7B

| | X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|---|
| Y0 | 20 | 9 | 18 | 8 | 2 | 1 | -41 | -36 | -39 | -61 | -56 | -13 | -9 | 3 | 17 | 32 |
| Y1 | 19 | 5 | 25 | 10 | 9 | 0 | 14 | -5 | 4 | -13 | -28 | 9 | -8 | 9 | -22 | 17 |
| Y2 | 6 | 1 | 5 | -9 | -15 | -14 | -31 | -17 | -22 | -38 | -28 | -30 | -8 | -14 | 5 | 19 |
| Y3 | -11 | 0 | 10 | 9 | 9 | -12 | 11 | 1 | 14 | 9 | -12 | 8 | -2 | 20 | -10 | 6 |
| Y4 | 17 | -3 | 24 | 14 | 7 | 0 | -32 | 14 | 13 | -43 | -35 | -15 | -7 | -25 | -4 | 14 |
| Y5 | -5 | -3 | 18 | 17 | 4 | -12 | -22 | 9 | -2 | -40 | -35 | -13 | 6 | -5 | 15 | 16 |
| Y6 | -7 | 4 | -1 | 11 | 15 | 11 | 16 | 63 | 38 | -17 | -34 | 15 | 3 | 25 | 7 | 7 |
| Y7 | -4 | -8 | 26 | 18 | 6 | -1 | -9 | 109 | 75 | -56 | -67 | -22 | -17 | 1 | 2 | 13 |
| Y8 | -15 | -8 | -4 | 5 | -19 | -46 | 52 | 552 | 525 | -27 | -188 | -22 | -26 | 18 | -12 | -13 |
| Y9 | 12 | -4 | 8 | -26 | 6 | -29 | 222 | 566 | 543 | 182 | -262 | -143 | -40 | -26 | -22 | 4 |
| Y10 | -2 | -16 | -38 | -25 | -25 | -7 | 391 | 536 | 505 | 350 | -219 | -68 | -23 | 5 | -15 | -31 |
| Y11 | -14 | -36 | 21 | -21 | 14 | 30 | 403 | 454 | 428 | 401 | -133 | -128 | -54 | -36 | -14 | 22 |
| Y12 | -36 | -35 | -30 | -17 | -26 | 34 | 426 | 448 | 412 | 409 | 34 | -30 | -27 | 17 | -11 | -8 |
| Y13 | -21 | -32 | 2 | -38 | 12 | 27 | 363 | 379 | 347 | 376 | 316 | -67 | -53 | -14 | -13 | 16 |
| Y14 | 9 | 12 | 10 | 20 | 2 | 77 | 395 | 378 | 336 | 342 | 365 | 77 | 7 | 30 | -22 | -12 |
| Y15 | -23 | -40 | 7 | -44 | 9 | 139 | 442 | 304 | 274 | 295 | 429 | 17 | -56 | -38 | -35 | 12 |
| Y16 | -34 | -33 | -65 | -39 | -22 | 240 | 450 | 311 | 259 | 285 | 426 | 169 | -3 | 10 | -25 | -20 |
| Y17 | -19 | -42 | 3 | -54 | 24 | 269 | 410 | 239 | 179 | 253 | 450 | 188 | -44 | -33 | -32 | 1 |
| Y18 | -19 | -31 | -70 | -37 | -19 | 268 | 401 | 265 | 228 | 243 | 457 | 362 | 3 | 21 | -12 | -32 |
| Y19 | -30 | -44 | 9 | -45 | 15 | 178 | 418 | 260 | 195 | 259 | 462 | 269 | -3 | -36 | -35 | 8 |
| Y20 | -28 | -39 | -63 | -35 | -43 | 26 | 368 | 339 | 305 | 335 | 488 | 292 | 19 | 23 | -14 | -34 |
| Y21 | -34 | -31 | 3 | -47 | -6 | -65 | 64 | 342 | 330 | 383 | 487 | 58 | -20 | -22 | -33 | 17 |
| Y22 | -11 | -10 | -37 | -16 | -14 | -64 | -183 | 147 | 449 | 538 | 398 | 69 | 11 | 7 | -22 | -30 |
| Y23 | -7 | -19 | 1 | -13 | 3 | -41 | -98 | -23 | 137 | 312 | 155 | 21 | 8 | -12 | -7 | 22 |
| Y24 | 6 | 7 | -17 | 7 | 7 | -6 | -42 | -20 | 54 | 90 | 47 | 48 | -1 | 11 | -6 | -5 |
| Y25 | 4 | 16 | -11 | 8 | 4 | 5 | -28 | -22 | -4 | 6 | -18 | 19 | 20 | 17 | -6 | -11 |

SYSTEM AND METHOD FOR IDENTIFYING INPUTS INPUT TO MOBILE DEVICE WITH TOUCH PANEL

PRIORITY

This application claims the benefit under 35 U.S.C. §119(a) of a Korean patent application filed on Oct. 27, 2011 in the Korean Intellectual Property Office and assigned Serial No. 10-2011-0110382, the entire disclosure of which is hereby incorporated by reference.

BACKGROUND OF THE INVENTION

1. Field of the Invention

The present invention relates to a mobile device. More particularly, the present application relates to a system and method for identifying types of touches input to a mobile device with a touch panel.

2. Description of the Related Art

Mobile devices are equipped with touch panels as input systems. Touch panels may be resistive touch panels, capacitive touch panels, and the like. Resistive touch panels (or pressure detecting types) are operated in such a way that when a user presses the screen, two transparent conductive films contact each other (e.g., through electrical contact; or through pressure) and the change in current and resistance is detected, which is used to acquire the coordinates (e.g., on the screen in the lengthwise and widthwise directions) at which the user pressed the screen. Capacitive touch panels use electrical charges on the user's body. LC glass plates of a capacitive touch panel are coated with conductive materials such that electrons are gathered at a point at which the user's finger touches the screen. In that case, the sensors of the touch panel detect the amount of electric charges and identify a touch that occurred at the point.

When touch screens display menus or letter input fields, the touch panels perform the input functions via the user's fingers or stylus pens. That is, conventional input methods employ menus or letter input fields in order to perform an input function. If a function is executed while an application is being executed, conventional mobile devices display a touch button corresponding to the function on the touch screen and execute it according to the user's touch.

Conventional touch input methods are performed via the users' touches. For example, if a user wishes to execute a touch input function in a mobile device, the mobile device displays a menu, touch buttons, etc. on a preset region on the touch screen according to a user's operation and allows the user to touch corresponding locations. However, conventional input methods require users to repeat a number of touch operations in order to execute a specific function while executing an application, which is inconvenient to the users.

Therefore, a need exists for a system and method for a system and method that can correctly detect a user's touch area size irrespective of the states of a mobile device.

The above information is presented as background information only to assist with an understanding of the present disclosure. No determination has been made, and no assertion is made, as to whether any of the above might be applicable as prior art with regard to the present invention.

SUMMARY OF THE INVENTION

An aspect of the present invention is to address at least the above-mentioned problems and/or disadvantages and to provide at least the advantages describes below. Accordingly, an aspect of the present invention is to provide a system and method that can correctly detect a user's touch area size irrespective of the states of a mobile device.

In accordance with an aspect of the present invention, a system of identifying an input in a mobile device is provided. The system includes a touch screen comprising a touch panel, a memory for storing information to execute a function of an application, corresponding to a touch area size and a touch interaction; and a controller for identifying, when a touch is detected via the touch panel, the touch area size and the touch interaction, for determining information to execute a function corresponding to the identified touch area size and the identified touch interaction by referring to the memory, and for controlling a function of the application that is currently being executed.

In accordance with another aspect of the present invention, a method of identifying a input in a mobile device with a touch panel is provided. The method includes detecting, when a touch is detected via the touch panel, the touch area size, analyzing whether the location of the touch is altered and identifying the touch interaction, identifying information to execute a function of an application according to the identified touch area size and the identified touch interaction, and controlling a function of the application that is currently being executed, based on the identified function executing information.

In accordance with another aspect of the present invention, a method of identifying an input in a mobile device with a touch panel is provided. The method includes comparing the output of the touch panel with a first touch threshold serving to identify the presence of a touch, and determining whether a touch has occurred on the touch panel, comparing the output of the touch panel with a second touch threshold, which is less than the first touch threshold, and detecting the touch area size; analyzing whether a location of the touch is altered, identifying a touch interaction based on the analysis, identifying information to execute a function of an application corresponding to the identified touch area size and the identified touch interaction, and controlling a function of the application that is currently being executed, based on the identified function executing information.

In accordance with another aspect of the present invention, a system for detecting touches applied to a mobile device is provided. The system includes a touch screen comprising a touch panel, and a controller including a touch identifying unit for comparing an output of the touch panel with a first touch threshold serving to identify the presence of a touch, and for determining whether the touch has occurred, and a size sensing unit for comparing the output of the touch panel with a second touch threshold serving to identify a touch area size, and for identifying the touch area size, wherein the second touch threshold is less than the first touch threshold, and wherein the controller for identifies a type of the touch according to the identified touch area size.

In accordance with another aspect of the present invention, a method for identifying touches applied to a mobile device with a touch panel is provided. The method includes comparing the output of the touch panel with a first touch threshold serving to identify the presence of a touch, and determining whether a touch has occurred on the touch panel, comparing the output of the touch panel with a second touch threshold serving to identify the touch area size and which is less than the first touch threshold, and detecting the touch area size, and identifying a type of touch interaction based on the touch area size.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6A illustrates a touch panel showing a number of touch nodes, if a size reference value is set to 50 in a palm sweep gesture, when a user holds a mobile device, according to an exemplary embodiment of the present invention;

FIG. 6B illustrates a touch panel showing a number of touch nodes, if a size reference value is set to 50 in a palm sweep gesture, when a user does not hold a mobile device, according to an exemplary embodiment of the present invention;

FIG. 7A illustrates a touch panel showing a number of touch nodes, if a size reference value is set to 20 in a palm sweep gesture, when a user holds a mobile device, according to an exemplary embodiment of the present invention;

FIG. 7B illustrates a touch panel showing a number of touch nodes, if a size reference value is set to 20 in a palm sweep gesture, when a user does not hold a mobile device, according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
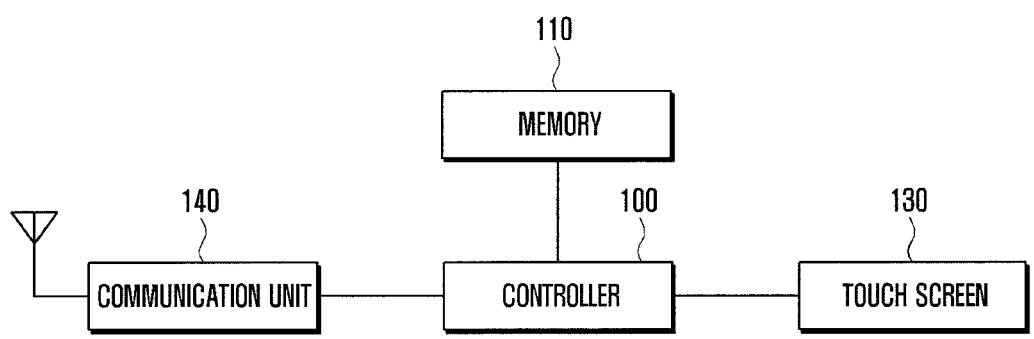
FIG. 1 illustrates a schematic block diagram of a mobile device according to an exemplary embodiment of the present invention.

The following description with reference to the accompanying drawings is provided to assist in a comprehensive understanding of exemplary embodiments of the invention as defined by the claims and their equivalents It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and s constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A first exemplary embodiment of the present invention is implemented in such a way that: functions associated with sizes of touch areas and types of touch interaction are set to a mobile device with a touch panel, a size of a touch area (hereinafter, a touch area size) and a type of touch interaction are identified when a touch is detected, and a corresponding function is executed. Touches may be detected while application programs are being executed. For example, a user can make a touch on an input field on the touch screen or on a blank region of the touch screen at which buttons are not displayed.

A second exemplary embodiment of the present invention is implemented in such a way that, when a user inputs a touch to a touch panel of a mobile device, the touch area can be correctly detected, irrespective of states in which the mobile device is postured. In an exemplary embodiment of the present invention, the touch panel may be implemented with a capacitive touch panel. Capacitive touch panels may have different levels of touch sensitivity according to the states in which the mobile device is postured. For example, if a mobile device is held by the user or placed such that a closed loop is formed, the mobile device has a high level of touch sensitivity. In contrast, if a mobile device is not held by the user or placed such that a closed loop is not formed (e.g., the mobile device is placed on a rubber plate on a desk, which is called free space, i.e., a floating state), the mobile terminal has a low level of touch sensitivity. The system and method according to exemplary embodiments of the present invention can correctly detect a touch area when the mobile device is placed in a floating state.

In the following description, the term 'touch area size' refers to a size of an area that is actually touched and detected on the touch panel by a user's finger or hand, an object such as a stylus pen, and the like. The term 'touch area size' also means the number of nodes from among the nodes of the panel, which exceeds a preset touch threshold value. The touch threshold value refers to a reference value to determine whether nodes are touched. The touch threshold value may be a first touch threshold, a second touch threshold, or a size threshold. The first touch threshold refers to a reference value to determine whether the touch panel is touched, (i.e., whether the touch has occurred on the touch panel). The second touch threshold refers to a reference value to identify a touch area size. The term 'to hold/grip' refers to a state in which a mobile device forms a closed loop with the earth ground. The term 'free space or float' refers to a state where a mobile device, placed on a desk, etc., does not form a closed loop with the earth ground or incompletely forms a close loop with the earth ground. The term 'touch interaction' refers to a touch action that touches a touch panel.

The following description explains a first exemplary embodiment of the invention.

FIG. 1 illustrates a schematic block diagram of a mobile device according to an exemplary embodiment of the present invention.

Referring to FIG. 1, the mobile device includes a controller 100, a memory 110, a touch screen 130, and a communication unit 140. The communication unit 140 communicates with external systems or base stations. For example, the communication unit 140 includes a transmitter, an amplifier for low-noise amplifying received RF signals, and a frequency down converter for down-converting the frequency of the received RF signals to a base band. The transmitter includes a frequency up converter for up-converting the frequency of signals to be transmitted to an RF band and a power amplifier. The communication unit 140 may also include a modulator for modulating signals to be transmitted and for transferring the modulated signals to the transmitter, and a demodulator for demodulating signals received via the receiver. For example, the modulator and demodulator may employ WCDMA, GSM, LTE, Wi-Fi, Wi-Bro, and the like, according to types of communication protocol.

The controller 100 controls the entire operation of the mobile device. The controller 100 analyzes the touch area size and the touch interaction and performs corresponding functions according to the analysis. As an example, the controller 100 includes an application processor for executing an application in the mobile device and a communication processor. The communication processor may include a modulator-demodulator for modulating and demodulating signals to be transmitted via the communication unit 140 or signals received via the communication unit 140.

The memory 110 includes a program memory and a data memory. The program memory stores an operating system of the mobile device and application programs related to the invention. The data memory stores installed data and data created when the programs are executed. The memory 110 stores a touch threshold to determine whether a touch is made or has occurred on the touch panel, and information to execute a function of an application corresponding to a touch area size and a touch interaction.

The touch screen 130 includes a touch panel and a display unit. The touch screen 130 displays screen data under the control of the controller 100 and detects a user's input touches. In an exemplary embodiment of the present invention, it is assumed that the touch panel is implemented with a capacitive touch panel.

Although it is not shown in FIG. 1, it should be understood that the mobile device may further include a camera module, a short-range communication unit (e.g., Bluetooth, NFC, USB, and the like), a digital broadcasting module, and the like.

The controller 100 analyzes a touch area size and a touch interaction, detected via the touch panel of the touch screen 130, and performs a function corresponding to the analyzed touch area size and the analyzed touch interaction.

Figure 2:
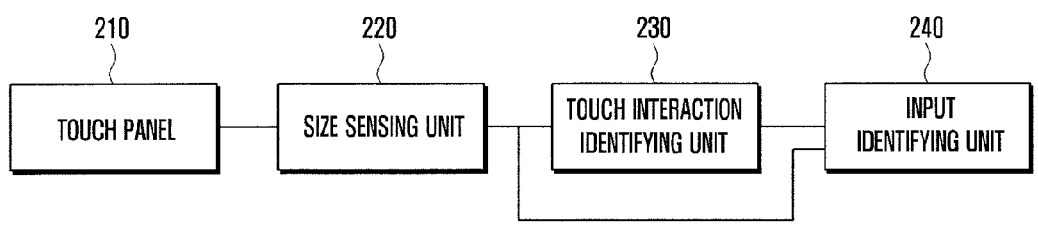
FIG. 2 illustrates a detailed view of a controller in a mobile device such as, for example the mobile device as shown in FIG. 1, according to an exemplary embodiment of the present invention.

FIG. 2 illustrates a detailed view of a controller in a mobile device such as, for example, the mobile device shown in FIG. 1, according to an exemplary embodiment of the present invention.

The touch sensing method according to exemplary embodiments of the present invention is performed based on the detection of a touch area size and a touch interaction. A touch type is determined by determining whether the touch is made by the user's fingers, hand edges, palm, and the like. A touch action is determined by determining whether the touch is made via a drag gesture, a rotation gesture, a twist gesture, a sweep gesture, a stop gesture, and the like. The memory 110 stores information to execute functions corresponding to touch area sizes and touch interactions. When a touch is made, the controller 100 analyzes: the touch area size to detect that the touch is made via a finger, a hand edge, or a palm; and the touch action to identify the touch interaction. The controller 100 accesses function execution information regarding an application registered in the memory 110 and executes a corresponding function according to the identified touch area size and the touch interaction.

Referring to FIG. 2, the touch panel 210 is included in the touch screen 130. The touch panel 210 may be a capacitive touch panel or a resistive touch panel. When a touch is applied to the touch panel 210, the area sensing unit 220 detects the touch action and the number of touched nodes via a touch threshold and detects the touch area size (i.e., touch area). The touch threshold may be a reference value to identify whether a touch is applied to the touch panel or a reference value to identify a touch area size, where the reference value to identify whether a touch is applied to the touch panel and the reference value to identify a touch area size are set to differ from each other. The touch interaction identifying unit 230 periodically analyzes whether the location of a preset point in the touch, detected via the area sensing unit 220, is altered, and identifies the touch interaction. Examples of the touch interaction include a variety of touch actions such as a twist, a sweep, a stop, and the like. The input identifying unit 240 identifies a user's input touch, based on the signal corresponding to the touch area size, output from the size sensing unit 220 and the touch interaction identified via the touch interaction identifying unit 230. For example, the input identifying unit 240 detects the touch area size and the touch interaction, and an application that is currently being executed, then the input identifying unit 240 identifies a corresponding input referring to information to execute a function corresponding to the identified touch area size and the identified touch interaction in the memory 110, and performs the function of the currently executed application.

Figure 3A:
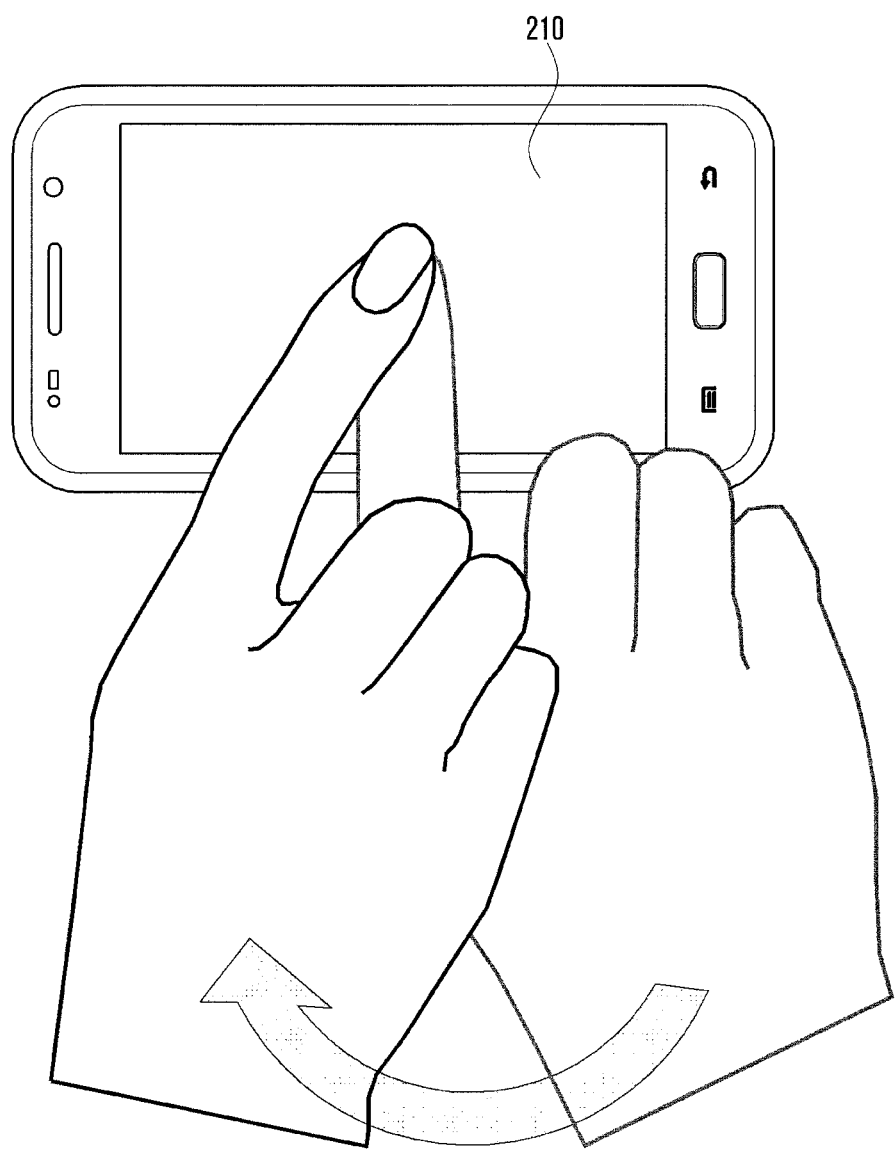
FIGS. 3A to 3C illustrate views to describe a method for identifying touch inputs, according to an exemplary embodiment of the present invention.
Figure 3B:
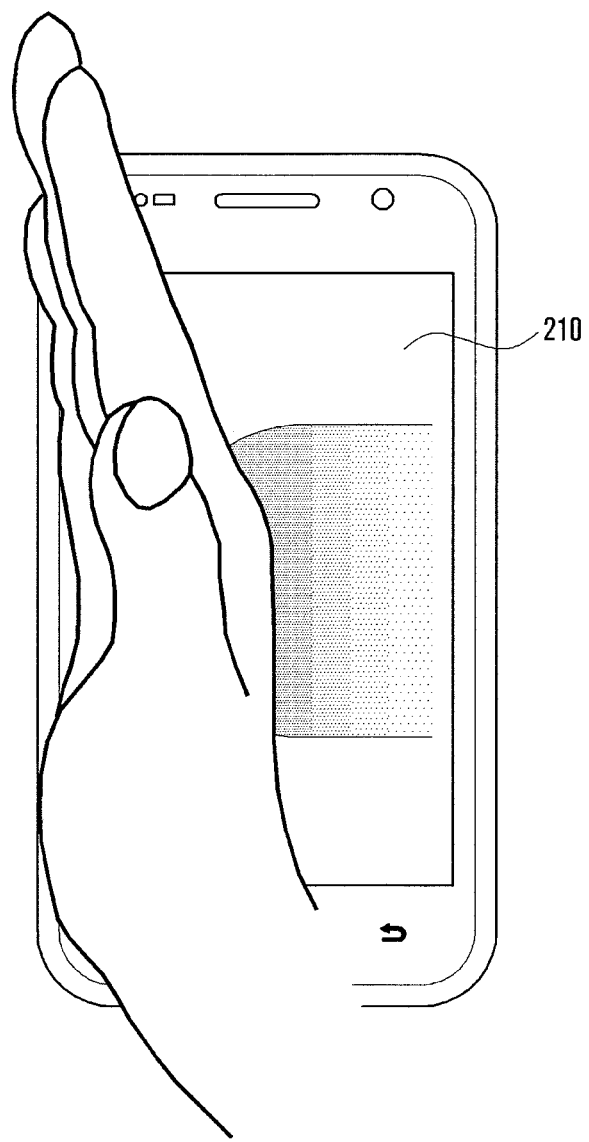
Figure 3C:
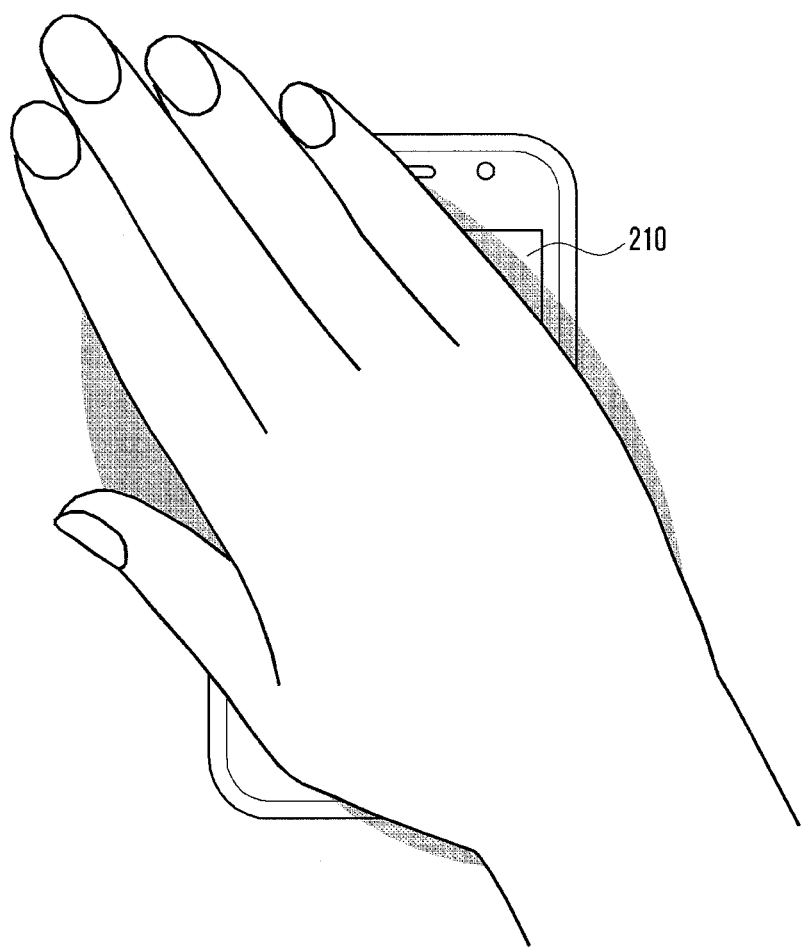

FIGS. 3A to 3C illustrate views to describe a method for identifying touch inputs, according to an exemplary embodiment of the present invention.

FIG. 3A is a view showing a tap & twist gesture where a user's finger taps and then twists on the touch panel 210. FIG. 3B is a view showing a palm sweep where a user's hand edge sweeps from left to right or vice versa, with the touch on the touch panel 210. FIG. 3C is a view showing a palm touch where a user's palm touches the touch panel 210 and holds the touch thereon. When a user creates a touch on the touch panel 210 via his/her finger, hand edge or palm, the size sensing unit 220 detects the touch area size. The touch interaction identifying unit 230 analyzes an alteration in the location of the touch from the signal periodically output from the touch panel 210, and then identifies the touch action (e.g., twist, sweep, stop, and the like). The input identifying unit 240 detects the touch area size and the touch interaction, based on the signals output from the size sensing unit 220 and the touch interaction identifying unit 230, and then identifies a function corresponding to the identified touch area size and the identified touch interaction refereeing to the memory 110.

For example, if the tap and twist gesture shown in FIG. 3A is set to correspond to a function for rotating a photograph, the palm sweep gesture shown in FIG. 3B is set to correspond to a function for capturing a photograph, and the palm touch as shown in FIG. 3C is set to correspond to a function for pausing a video. As an example, a look up table may be created as in the following Table 1 and stored in the memory 110.

TABLE 1

| Touch area size | Touch Interaction | Function | Remark |
|---|---|---|---|
| Area corresponding to finger | Twist | Rotate photograph | FIG. 3A |
| Area corresponding to hand edge | Sweep | Screen capture | FIG. 3B |
| Area corresponding to palm | Stop | Pause playing back video | FIG. 3C |

The input identifying unit 240 analyzes the signals output from the size sensing unit 220 and the touch interaction identifying unit 230. If the input identifying unit 240 identifies that the touch area size corresponds to a finger and the touch interaction corresponds to a twist action, based on the analyzed signals, the input identifying unit 240 concludes that the touch interaction is input to rotate a photograph currently displayed. If the input identifying unit 240 identifies that the touch area size corresponds to a hand edge and the touch interaction corresponds to a sweep action, based on the analyzed signals, the input identifying unit 240 concludes that the touch interaction is input to capture a photograph currently displayed. If the input identifying unit 240 identifies that the touch area size corresponds to a palm and the touch interaction corresponds to a stop action, based on the analyzed signals, the input identifying unit 240 concludes that the touch interaction is input to pause playing back a video.

When a corresponding application is executed without using menus or touch buttons in the mobile device, the command as described in Table 1 can be executed by operating a touch interaction on the touch panel 210. For example, if the user makes a touch action as shown in FIG. 3A on a photograph displayed on the touch screen 130, the controller 100 rotates the photograph thereon. If the user makes a touch action as shown in FIG. 3B on a photograph displayed on the touch screen 130, the controller 100 captures the photograph thereon. If the user makes a touch action as shown in FIG. 3C on the touch screen 130 where a video is played back, the controller 100 pauses playing back the video thereon. Therefore, the user makes a set touch interaction on a screen where a corresponding application is executed, thereby executing a corresponding function. Thus, the user does not need to execute the display of a menu or a touch button and touch it in order to set his/her desired function As such, when a user's touch is input to a screen of the touch panel 210 where an application is executed, the controller 100 analyzes the touch area size and the touch interaction according to the surface touch on the touch panel 210, and then performs a corresponding function of the application. The touch interaction may be made via a user's finger tip, hand edge, a number of fingers, a palm, and the like. If a touch is made via the finger tip, the touch area size may be detected in almost a same size (area) irrespective of the states of the mobile device (e.g., an earth ground state or a free space state). If a touch is made via the palm and/or the hand edge, the touch area size may differ in size (area) according to whether the mobile device is held (earth ground state) or not held (a free space i.e., a floating state).

Figure 4A:
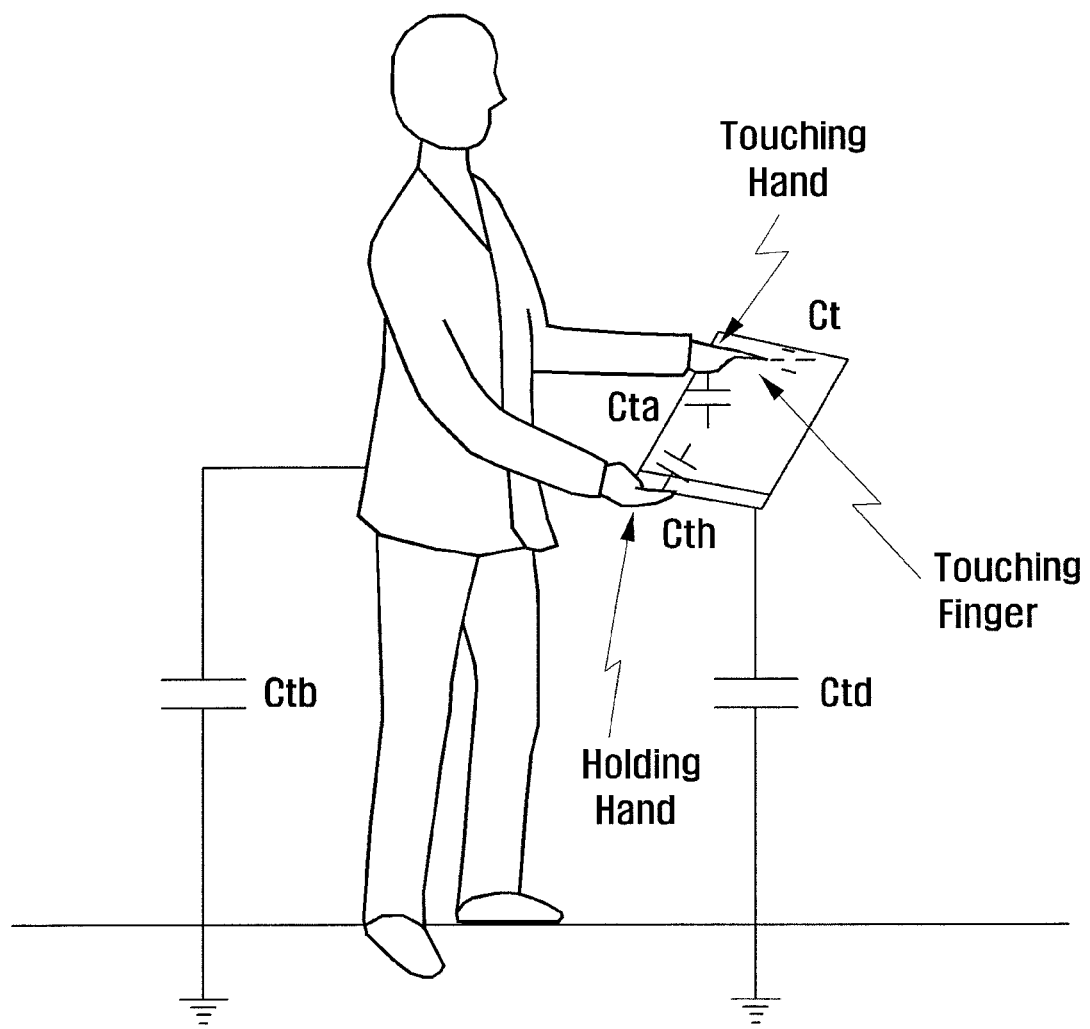
FIGS. 4A to 4C illustrate views to describe touch detecting characteristics in a touch panel of a mobile device when a user holds or does not hold it, according to an exemplary embodiment of the present invention.
Figure 4B:
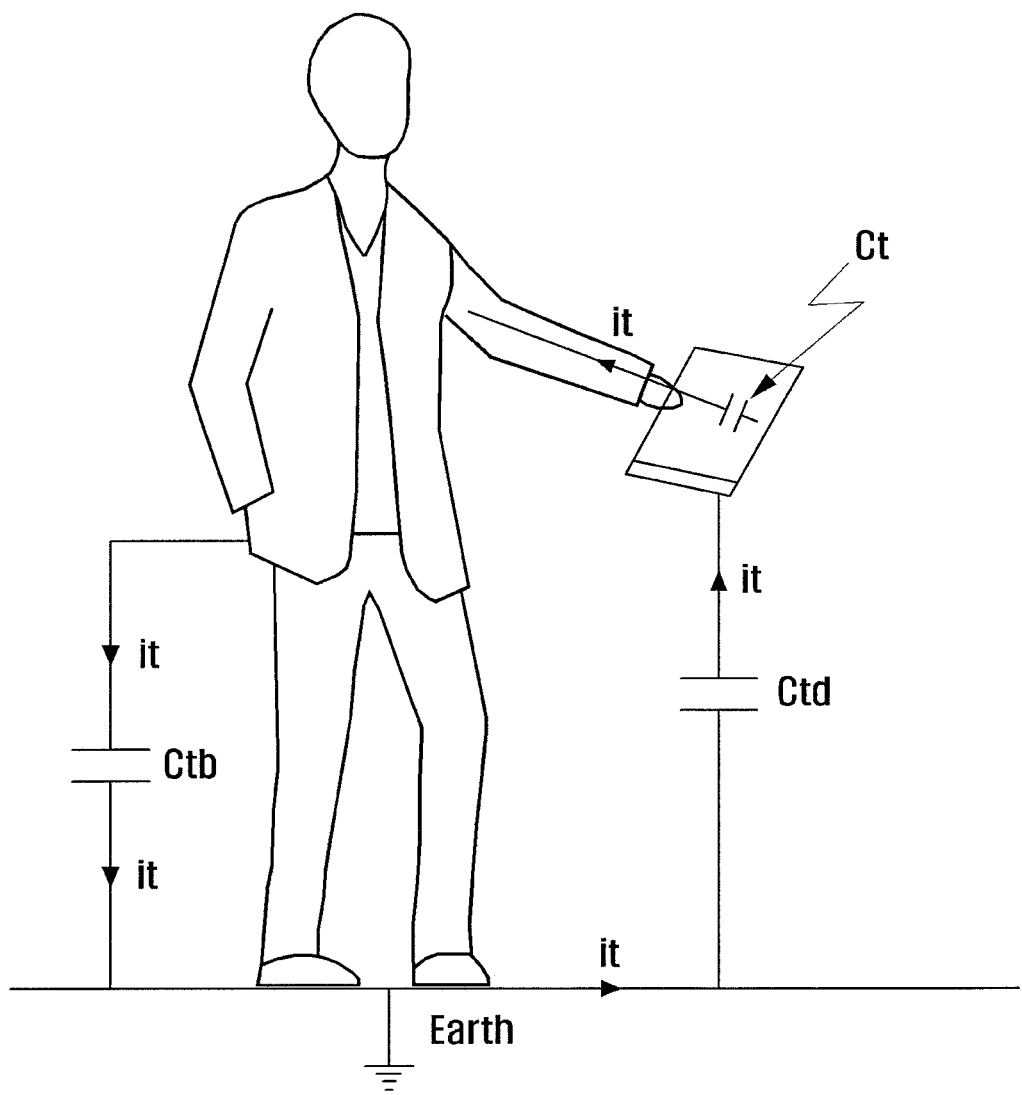
Figure 4C:
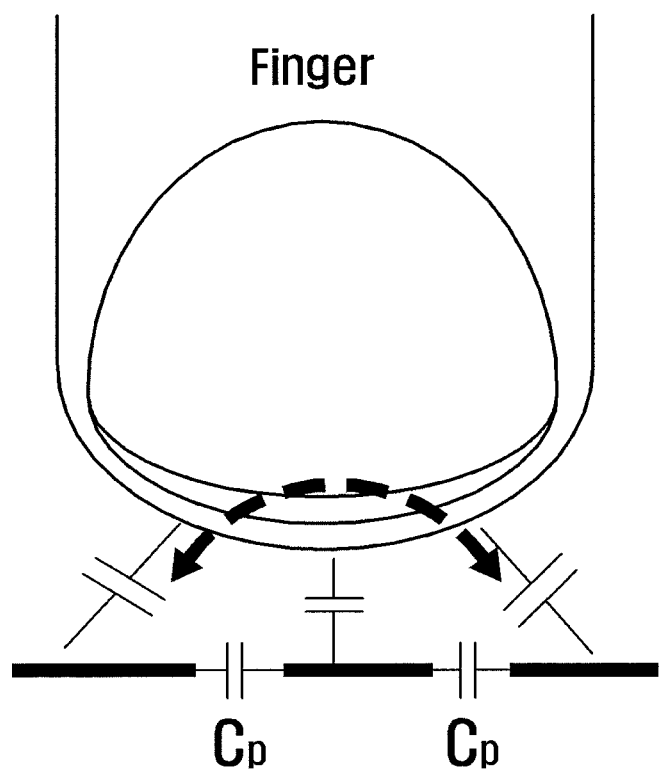

FIGS. 4A to 4C illustrate views to describe characteristics of detecting a touch area size on a touch panel of a mobile device when a user holds or does not hold the mobile device, according to an exemplary embodiment of the present invention.

Referring to FIGS. 4A to 4C, when a mobile device is in a floating state, the capacitive touch panel 120 may be low in touch sensitivity. This is because the mobile device is not grounded to the earth ground (i.e., a closed loop is not formed therebetween). A floating state refers to a state in which the mobile device is electrically isolated from the earth ground, via a nonconductor such as a leather notebook, and the like as shown in FIG. 4B. As shown in FIG. 4A, if a user holds a mobile device and makes a touch thereon, a closed loop is formed between the mobile device and the user, so that electric charges can flow from the mobile device to the ground via the user. In contrast, as shown in FIG. 4B, if a user makes a touch on a mobile device that is in a floating state, electric charges cannot flow from the mobile device to the earth ground. For example, when the mobile device is in a floating state, electric charges do not flow from the touch panel 210 to the user, but flow from the finger to the touch panel 210 as shown in FIG. 4C.

When a touch is made on an area over a pattern pitch on a touch panel of the mobile device in a floating state, the touch sensitivity is deteriorated due to electric charges flowing in other channels. Therefore, the touch panel 120 of the touch screen 130 cannot detect a user's surface touch when the mobile device is not held (i.e., in a floating state). In that case, the controller 100 cannot control a function of the currently executed application. The following Table 2 describes cases in which a touch is made on a touch panel of a mobile device according to whether the user holds the mobile device as shown in FIGS. 3A to 3C.

TABLE 2

| | Tap & Twist | | | | Palm Sweep | | | | Palm Touch | | | |
|---|---|---|---|---|---|---|---|---|---|---|---|---|
| Touch Threshold | Held | Not Held | G (#) | G (%) | Held | Not Held | G (#) | G (%) | Held | Not Held | G (#) | G (%) |
| 50 | 12 | 11 | 1 | 8.3 | 66 | 28 | 38 | 57.6 | 141 | 72 | 69 | 48.9 |

Table 2 shows information acquired when touches are performed on a touch panel 120 with 16 widthwise nodes (X0~X15) and 26 lengthwise nodes (Y0~Y25), assuming that the touch threshold for indication to determine whether a touch is made is 50. In Table 2, the field, 'Held,' refers to the number of nodes in an area on the touch panel, detected by a user's touch in a state in which the user holds the mobile device. The field, 'Not Held,' refers to the number of nodes in an area on the touch panel, detected by a user's touch in a state in which the user does not hold the mobile device (i.e., in a floating state). The field, 'G (#),' refers to the difference between the number of nodes in the area detecting a touch on the touch panel in a state in which the user holds the mobile device and the number of nodes in the area detecting a touch on the touch panel in a state in which the user does not hold the mobile device. The field, 'G (%),' refers to another expression of G (#) as percentage.

As described in Table 2, G (#) is 1, 38 and 69 for a tap & twist gesture, a palm sweep, and a palm touch, respectively. For example, the tap & twist gesture does not bring about a relatively large difference between the numbers of nodes in states in which the user holds and does not hold the mobile device. In contrast, the palm sweep and palm touch gestures each bring about a relatively large difference between the numbers of nodes in states in which the user holds and does not hold the mobile device. This is because the palm sweep and palm touch actions each cause the touch interactions to contact a relatively large touch size on the touch panel 210, and this causes the large difference between the number of nodes detecting the touches when the user holds and does not hold the mobile device.

Therefore, it is preferable that a mobile device with a capacitive touch panel is designed to correctly detect a touch area size (e.g., by a finger, a hand edge, a palm, a number of fingers, and the like), irrespective of whether the user holds or does not hold the mobile device.

The following description provides a capacitive touch panel 210, a mobile device therewith, and the touch sensing method.

Figure 5A:
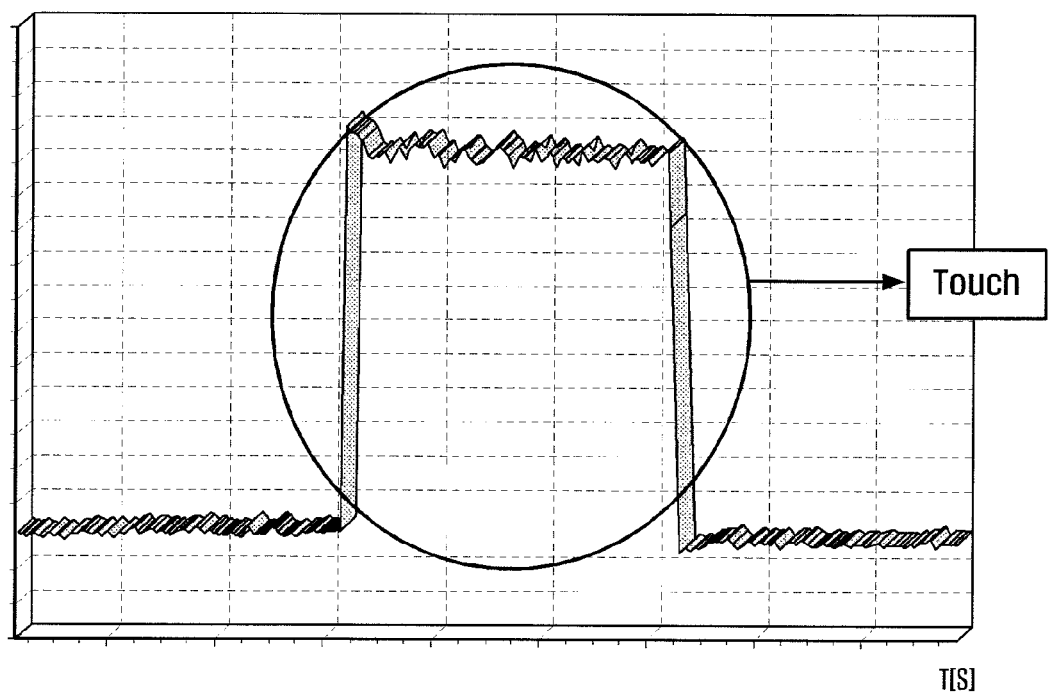
FIG. 5A illustrates a diagram of a signal waveform with a change in magnitude (which difference is called delta) when a touch is applied to a capacitive touch panel, according to an exemplary embodiment of the present invention.
Figure 5B:
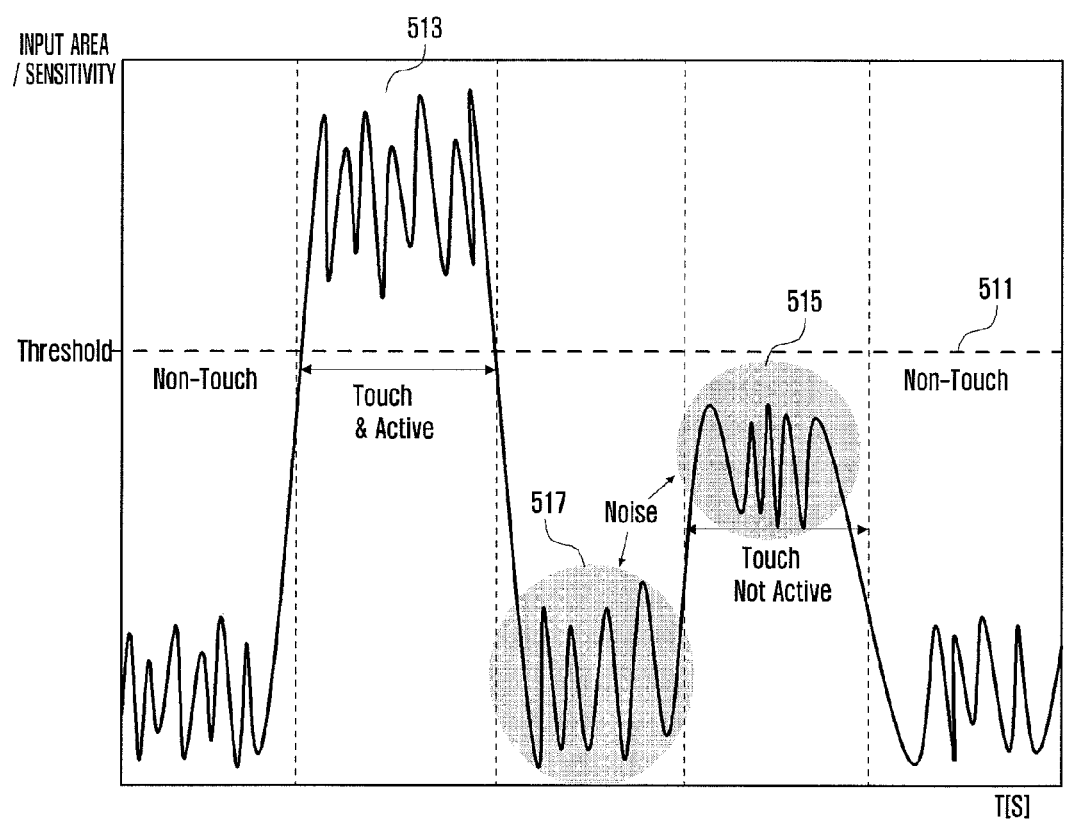
FIG. 5B illustrates a diagram of a signal with a reference value to identify touches, according to an exemplary embodiment of the present invention.

FIG. 5A illustrates a diagram of a signal waveform with a change in magnitude (which difference is called delta) when a touch is applied to a capacitive touch panel, according to an exemplary embodiment of the invention. FIG. 5B illustrates a diagram of a signal with a reference value (e.g., a touch threshold) to identify touches (e.g., to identify whether a touch is made), according to an exemplary embodiment of the present invention.

Referring to FIGS. 5A and 5B, when the user applies a touch to the capacitive touch panel, the touch interactions create the change in capacitance at the touched area on the panel and causes a change in magnitude of a signal. The variation is called delta. FIG. 5A shows an example of a delta created when a touch is made on the touch panel. Reference number 511 in FIG. 5B is a touch threshold for determining whether a touch is made on the touch panel. When a touch is made on the touch panel, the signal is altered in such a way that the magnitude increases to be larger than the touch threshold, which provides a delta. In that case, the mobile device determines that the touch interaction is a touch & active action. For example, the signal 513 corresponds to a signal that is altered in such a way that the magnitude (delta) is greater than the touch threshold 511. In contrast, if a touch is made on the touch panel and the signal 515 is altered in such a way that the magnitude (delta) is less than the touch threshold 511, the mobile device determines that a touch interaction has not been made (i.e., a touch not active). Signal 517 also corresponds to a signal for which the magnitude (delta) is less than the touch threshold 511.

The touch area size may have the number of nodes over the touch threshold 511. For example, a general touch sensing method detects a touch action, using only one touch threshold, identifies the number of touched nodes via the touch threshold, and determines the number of the touched nodes as the touch area size. Although the general touch sensing method can correctly identify the number of touch nodes in a state in which the user holds the mobile device, as described in Table 2, the general touch sensing method cannot correctly detect the number of touched nodes in a state in which the user does not hold the mobile device. In order to correctly detect the number of touched nodes, it is required that a first touch threshold for identifying a touch interaction and a second touch threshold for identifying the touch area size are set to differ from each other. The exemplary embodiment of the present invention employs a touch threshold to detect the presence of a touch and a size threshold to identify the touch area size, which differ from each other. In an exemplary embodiment of the present invention, the size threshold may be less than the touch threshold, when analyzing a touch interaction in a free state of the mobile device. Identifying a touch area size is performed irrespective of the operation of detecting a touch interaction. In that case, the size sensing unit 220 detects a touch area size by using a size threshold serving as the second touch threshold.

The size sensing unit 220 compares a delta of the number of touched nodes with the size threshold and creates information regarding nodes to identify the touch area size. In order to correctly acquire information regarding the touch area size, the size threshold needs to be set to correctly identify nodes touched irrespective of whether the user holds or does not hold the mobile device. For example, if the size threshold is set to 50 and a palm sweep touch and a palm touch are made, the respective touch area sizes may have a large difference between states in which the user holds and does not hold the mobile device. This means that, if the size threshold is less than the touch threshold, the touch area size identified when the user holds and does not hold the mobile device is reduced. For example, the numbers of nodes to detect touches are empirically acquired with respect to touch thresholds respectively. One of the touch threshold is set to a size threshold when the number of nodes, required for detecting a touch in state whether the user holds and does not hold the mobile device, has the smallest error. The following Table 3 describes the number of nodes detected when touches are made on a touch panel of a mobile device, with 16×26 nodes, depending on whether the user holds or does not hold the mobile device.

TABLE 3

| | Tap & Twist | | | | Palm Sweep | | | | Palm Touch | | | |
|---|---|---|---|---|---|---|---|---|---|---|---|---|
| Threshold | Held | Not Held | G (#) | G (%) | Held | Not Held | G (#) | G (%) | Held | Not Held | G (#) | G (%) |
| 10 | 24 | 21 | 3 | 12.5 | 99 | 81 | 18 | 18.2 | 230 | 187 | 43 | 18.7 |
| 20 | 20 | 19 | 1 | 5.0 | 84 | 75 | 9 | 10.7 | 202 | 161 | 41 | 20.3 |
| 30 | 16 | 16 | 0 | 0.0 | 77 | 65 | 12 | 15.6 | 179 | 135 | 44 | 24.6 |

TABLE 3-continued

| | | Tap & Twist | | | | Palm Sweep | | | | Palm Touch | | |
|---|---|---|---|---|---|---|---|---|---|---|---|---|
| Threshold | Held | Not Held | G (#) | G (%) | Held | Not Held | G (#) | G (%) | Held | Not Held | G (#) | G (%) |
| 40 | 13 | 12 | 1 | 7.7 | 71 | 47 | 24 | 33.8 | 162 | 110 | 52 | 32.1 |
| 50 | 12 | 11 | 1 | 8.3 | 66 | 28 | 38 | 57.6 | 141 | 72 | 69 | 48.9 |

As described in Table 3, 20 is the reference value (e.g., threshold) when a palm sweep action and a palm touch action has an error of touch area size in states in which the user holds and does not hold the mobile device. In that case, the touch threshold Th1 is set to 50, and the size threshold Th2 is set to 20. The size threshold Th2 serves to provide information regarding a touch area size.

FIG. 6A illustrates a touch panel showing a number of touch nodes, if a size threshold is set to 50 in a palm sweep, when a user holds a mobile device, according to an exemplary embodiment of the present invention. FIG. 6B illustrates a touch panel showing a number of touch nodes, if a size threshold is set to 50 in a palm sweep gesture, when the user does not hold a mobile device, according to an exemplary embodiment of the present invention. FIG. 7A illustrates a touch panel showing a number of touch nodes, if a size reference value (e.g., threshold) is set to 20 in a palm sweep gesture, when a user holds a mobile device, according to an exemplary embodiment of the present invention. FIG. 7B illustrates a touch panel showing a number of touch nodes, if a size reference value (e.g., threshold) is set to 20 in a palm sweep gesture, when a user does not hold a mobile device, according to an exemplary embodiment of the present invention.

A threshold of 50 corresponds to 400 (=50×8). Similarly, a threshold of 20 corresponds to 160 (=20×8). If a threshold is 50 and the number of nodes detected is more than 400, then the mobile device determines that a touch has been made on the touch panel. In that case, the number of nodes detected when the user holds the mobile device is 68 as shown in FIG. 6A, and the number of nodes detected when the user does not hold the mobile device is 28 as shown in FIG. 6B. If a threshold is 20 and the number of nodes detected is more than 160, then the mobile device determines that a touch has been made on the touch panel. In that case, the number of nodes detected when the user holds the mobile device is 85 as shown in FIG. 7A, and the number of nodes detected when the user does not hold the mobile device is 75 as shown in FIG. 7B.

As described above, if a palm sweep gestures is made on a touch panel for which a threshold is set to 50, the difference may be relatively large between the number of nodes detected when the user holds the mobile device and the number of nodes detected when the user does not hold the mobile device. Likewise, if a palm sweep gestures is made on a touch panel for which a threshold is set to 20, the difference may be relatively small between the number of nodes detected when the user holds the mobile device and the number of nodes detected when the user does not hold the mobile device. Therefore, if a threshold is set to 50 to detect whether a touch is made and a threshold is set to 20 to identify the touch area size, the mobile device can correctly detect the presence of a touch and the touch area size. In a second exemplary embodiment of the present invention, the presence of a touch on a touch panel 210 is detected using a first touch threshold Th1 and the touch area size is identified via a second touch threshold Th2.

Figure 8:
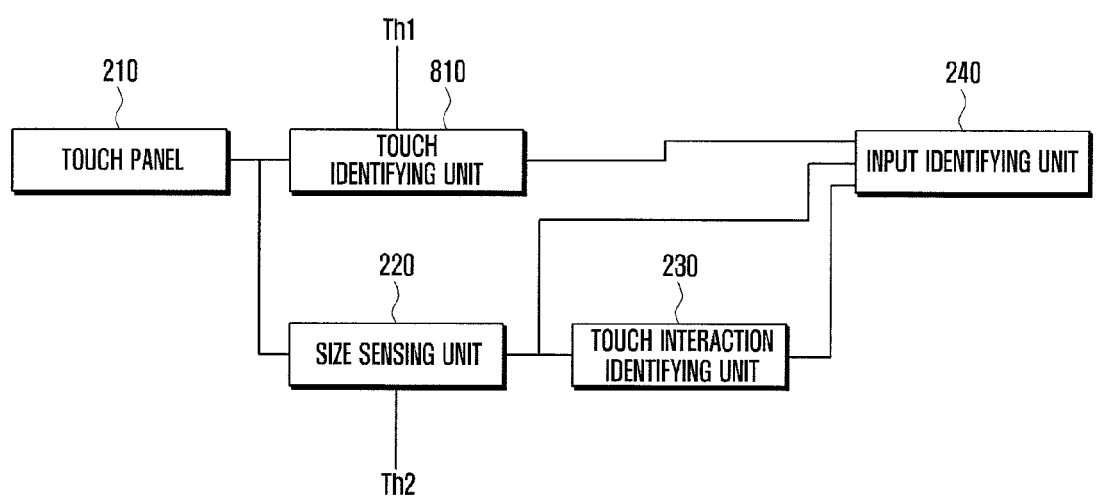
FIG. 8 illustrates a detailed view showing an exemplary embodiment of a controller that identifies touch area sizes and types of touch interactions in a mobile device, according to an exemplary embodiment of the present invention.

FIG. 8 illustrates a detailed view showing an exemplary embodiment of a controller that identifies touch area sizes and types of touch interactions in a mobile device, according to an exemplary embodiment of the present invention.

Referring to FIG. 8, the touch panel 210 is installed to the touch screen 130 and may be implemented with a capacitive touch panel. The touch identifying unit 810 identifies the presence of a touch on the touch panel 210 using a touch threshold (e.g., a first touch threshold) Th1. For example, if a touch interaction is detected in one or more nodes greater than the first touch threshold Th1, the touch identifying unit 810 identifies the presence of a touch. The size sensing unit 220 detects a touch area size on the touch panel 210 using a size threshold (e.g., a second touch threshold) Th2. The size sensing unit 220 detects all nodes greater than the second touch threshold Th2 and identifies the touch area size based on the number of detected nodes and the locations. In an exemplary embodiment of the present invention, the second touch threshold Th2 is set to be less than the first touch threshold Th1. The second touch threshold Th2 serves to identify a touch area size. The touch area size may be various patterns according to the touch modes (e.g., finger tip, hand edge, palm, and the like). Therefore, the size sensing unit 220 may also identify touch patterns while identifying the touch area size. The touch interaction identifying unit 230 periodically analyzes whether the location of a preset point in a touch (or a touch pattern), detected via the size sensing unit 220, is altered, and identifies the touch interaction. For example, the touch interaction is identified by analyzing whether the touch location is periodically altered. Examples of the touch interaction include a twist, a sweep, a stop, and the like. The input identifying unit 240 analyzes a touch area size and a touch interaction, detected via the size sensing unit 220, and detects a corresponding command for controlling an application that is currently being executed, based on the analysis. For example, the input identifying unit 240 identifies an input for controlling the operations of the application, based on the identified touch area size and the identified touch interaction by referring to the function executing information of the application in the memory 110.

The exemplary embodiment of the present invention shown in FIG. 8 may serve as a system for detecting the type of touch applied to the mobile device. As an example, in that case, the mobile device may be implemented in such a way to include the components shown in FIG. 8, except for the touch interaction identifying unit 230. As an example, in that case, when the controller 100 identifies the presence of a touch via the touch identifying unit 810, the controller 100 can determine the type of the touch via the touch area size detected by the size sensing unit 220.

Figure 9:
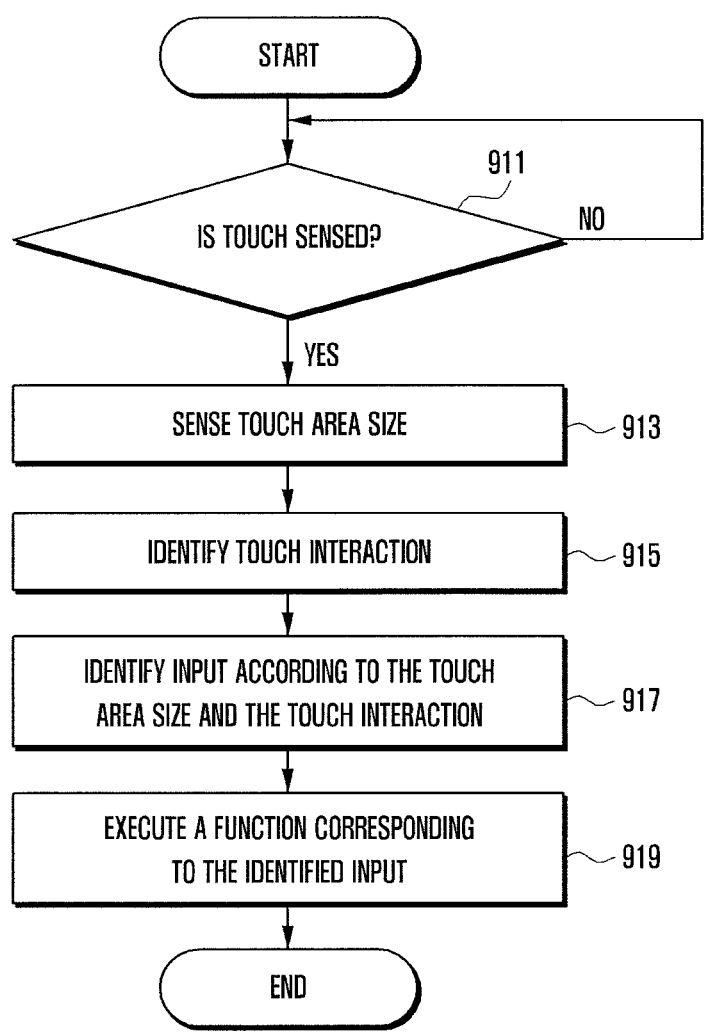
FIG. 9 illustrates a flow chart that describes a method for identifying a touch area size and a type of touch interaction in a mobile device with a touch panel, according to an exemplary embodiment of the present invention.

FIG. 9 illustrates a flow chart that describes a method for identifying a touch area size and a type of touch interaction in a mobile device with a touch panel, according to an exemplary embodiment of the present invention.

Referring to FIG. 9, the controller 100 determines whether a touch has occurred on the touch panel 210 of the touch screen 130 at step 911. If the controller 100 detects a signal at the touched area that is changed in amplitude greater than a touch threshold (e.g., a first touch threshold) Th1, the controller 100 determines that a touch has occurred thereto and counts the number of nodes at which the amplitude of the signal is greater than the size threshold (e.g., a second touch threshold) Th2 at step 913. The number of counted nodes corresponds to the touch area size. The touch area size may be in various patterns according to the touch types (e.g., finger tip, hand edge, palm, and the like). Therefore, the size sensing unit may also identify touch patterns while identifying the touch area size. The controller 100 analyzes whether the location of a preset point in a touch (or a touch pattern) is altered, and identifies the touch interaction at step 915. After that, the controller 100 analyzes the touch area size and the touch interaction and identifies the user's input at step 917. For example, the controller 100 identifies a touch area size and a touch interaction on the touch panel 210 and detects an input corresponding to the identified touch area size and the identified touch interaction by referring to function executing information of an application in the memory 110. After that, the controller 100 controls a corresponding function of the application that is currently being executed, based on the identified input, at step 919. For example, at step 919, the controller 100 executes a function corresponding to the identified input.

The exemplary embodiment of the present invention shown in FIG. 9 may be modified in such a way so as to perform only a process for detecting a type of the touch in a mobile device. For example, performing the identification at step 915 of the touch interaction may be omitted and only the step 917 of identifying a type of the touch according to a touch area size may be performed. In that case, when the controller 100 identifies the presence of a touch via the touch identifying unit 810, the controller 100 can determine the type of touch via the touch area size detected by the size sensing unit 220.

As described above, the input identifying system and method according to exemplary embodiments of the present invention can allow users to execute an input function in a mobile device with a touch panel, via various types of touches and various types of touch interactions. The method and system can detect various types of touch (e.g., from fingers, hand edge, palm, and the like) and various types of touch interactions (e.g., operated by a user's fingers, hand edges, palm, and the like). The system and method can define inputs to the mobile device by the identified types of touch interactions, thereby precisely identifying touch input modes in the mobile device. Irrespective of whether the mobile device is held or not by the user's hand, the system and method can correctly detect a touch area size. Thus, the system and method can effectively execute a touch function even if the mobile device is not held by the user.

While the invention has been shown and described with references to certain exemplary embodiments thereof, it will be understood by those skilled in the art that various changes in form and details may be made therein without departing from the spirit and scope of the of the invention as defined by the appended claims and their equivalents.

What is claimed is:

1. A system of identifying an input in a mobile device, the system comprising:
  a touch screen comprising a touch panel;
  a memory configured to store information to execute functions of an application, each of the functions corresponding to a touch area size and a touch interaction; and
  a controller configured to:
    determine whether an output of the touch panel corresponding to a touch input is greater than a first touch threshold,
    reduce a difference between touch area size detectable during a held state of the mobile device and during a non-held state of the mobile device, by setting a second touch threshold lower than the first touch threshold,
    if the output is greater than the first touch threshold, determine the touch interaction, the touch interaction being determined based on:
      the output of the touch panel exceeding the second touch threshold, and
      an alteration in a location of the touch input, and perform a function corresponding to the determined touch interaction,
  wherein the output from the touch panel exceeding the second touch threshold is used to determine a touch area size.

2. The system of claim 1, wherein the controller further comprises:
  a touch interaction identifying unit configured to analyze an alteration of a location of the touch, and to identify the touch interaction; and
  an input identifying unit configured to identify a touch input by identifying a function corresponding to the touch area size and the touch interaction by referring to the memory.

3. The system of claim 2, wherein the touch area size is detected by a touch from at least one of fingers, a hand edge, and a palm.

4. The system of claim 2, wherein the touch interaction is one of a twist action, a sweep action, and a stop action.

5. The system of claim 4, wherein the input identifying unit is further configured to identify:
  if the touch area size corresponds to a finger touch area size and the touch interaction corresponds to the twist action, the touch interaction as an input to rotate a photograph;
  if the touch area size corresponds to a hand edge touch area size and the touch interaction corresponds to the sweep action, the touch interaction as an input to capture a photograph; and
  if the touch area size corresponds to a palm touch area size and the touch interaction corresponds to the stop action, the touch interaction as an input to pause a playback of a video.

6. The system of claim 1, wherein the controller further comprises:
  a touch interaction identifying unit configured to analyze whether a location of the touch is altered and to identify the touch interaction based on the analysis of whether the location of the touch is altered; and
  an input identifying unit configured to identify the one of the functions of the application corresponding to the touch area size and the touch interaction by referring to the memory, when the touch interaction identifying unit has identified the touch interaction.

7. The system of claim 6, wherein the touch panel is a capacitive touch panel and comprises N×M nodes, where N and M are integers.

8. The system of claim 7, wherein the size sensing unit is further configured to compare outputs of the N×M nodes of the touch panel with the second touch threshold, to count a number of the nodes greater than the second touch threshold, and to detect the nodes as a corresponding touch area size.

9. The system of claim 8, wherein:
the touch area size is detected by a touch from at least one of fingers, a hand edge, and a palm; and
the touch interaction is one of a twist action, a sweep action, and a stop action.

10. The system of claim 9, wherein the input identifying unit is further configured to identify:
if the touch area size corresponds to a finger touch area size and the touch interaction corresponds to the twist action, the touch interaction as an input to rotate a photograph;
if the touch area size corresponds to a hand edge touch area size and the touch interaction corresponds to the sweep action, the touch interaction as an input to capture a photograph; and
if the touch area size corresponds to a palm touch area size and the touch interaction corresponds to the stop action, the touch interaction as an input to pause a playback of a video.

11. A method of identifying an input in a mobile device with a touch panel, the method comprising:
determining whether an output of the touch panel corresponding to a touch input is greater than a first touch threshold;
reducing a difference between touch area size detectable during a held state of the mobile device and during a non-held state of the mobile device, by setting a second touch threshold lower than the first touch threshold;
if the output is greater than the first touch threshold, determining a touch interaction, the touch interaction being determined based on:
the output of the touch panel exceeding the second touch threshold, and
an alteration in a location of the touch input; and
performing a function corresponding to the determined touch interaction,
wherein the output from the touch panel exceeding the second touch threshold is used to determine a touch area size.

12. The method of claim 11,
wherein the touch area size is detected by a touch from at least one of fingers, a hand edge, and a palm, and
wherein the touch interaction is one of a twist action, a sweep action, and a stop action.

13. The method of claim 12, wherein the identifying of the one of the functions further comprises:
identifying, if the touch area size corresponds to a finger touch area size and the touch interaction corresponds to the twist action, the touch interaction as an input to rotate a photograph;
identifying, if the touch area size corresponds to a hand edge touch area size and the touch interaction corresponds to the sweep action, the touch interaction as an input to capture a photograph; and
identifying, if the touch area size corresponds to a palm touch area size and the touch interaction corresponds to the stop action, the touch interaction as an input to pause a playback of a video.

14. A method of identifying an input in a mobile device with a touch panel, the method comprising:
determining whether an output of the touch panel corresponding to a touch input is greater than a first touch threshold;
reducing a difference between touch area size detectable during a held state of the mobile device and during a non-held state of the mobile device, by setting a second touch threshold lower than the first touch threshold; and
if the output is greater than the first touch threshold,
comparing the output of the touch panel with the second touch threshold,
analyzing whether a location of the touch is altered,
identifying a touch interaction based on the analysis of whether the location of the touch is altered, the touch alteration in the location of the touch being input from a signal periodically output from the touch panel,
identifying one of functions of an application corresponding to the detected touch area size and the identified touch interaction by referring to a memory of the mobile device which is configured to store information to execute the functions, each of the functions corresponding to a touch area size and a touch interaction, and
controlling the identified function of the application that is currently being executed,
wherein the output from the touch panel exceeding the second touch threshold is used to determine a touch area size.

15. The method of claim 14,
wherein the touch panel is a capacitive touch panel and comprises N×M nodes, where N and M are integers, and
wherein the detecting of the touch area size comprises:
comparing outputs of the N×M nodes of the touch panel with the second touch threshold;
counting a number of the nodes greater than the second touch threshold; and
detecting the nodes as a corresponding touch area size.

16. The method of claim 15,
wherein the touch area size is different depending on whether the touch is from fingers, a hand edge, or a palm, and
wherein the touch interaction is one of a twist action, a sweep action, and a stop action.

17. The method of claim 16, wherein the identifying of the one of the functions further comprises:
identifying, if the touch area size corresponds to a finger touch area size and the touch interaction corresponds to twist action, the touch interaction as an input to rotate a photograph;
identifying, if the touch area size corresponds to a hand edge touch area size and the touch interaction corresponds to sweep action, the touch interaction as an input to capture a photograph; and
identifying, if the touch area size corresponds to a palm touch area size and the touch interaction corresponds to the stop action, the touch interaction as an input to pause a playback of a video.

* * * * *